United States Patent Office 3,492,375
Patented Jan. 27, 1970

3,492,375
CYANFORMIC THIOESTERS
Wilhelm Gruber, Darmstadt, Peter Quis, Gross Zimmern, and Bernd Höpfner, Darmstadt, Germany, assignors to Rohm & Haas G.m.b.H., Darmstadt, Germany
No Drawing. Filed Mar. 22, 1966, Ser. No. 536,269
Claims priority, application Germany, Apr. 3, 1965,
R 40,309
Int. Cl. C07c *153/00;* A01n *9/12*
U.S. Cl. 260—455                10 Claims

ABSTRACT OF THE DISCLOSURE

Cyanformic thioesters useful as contact, ingestive and respiratory insecticides of the formula

NC—CO—SRX in which R is alkylene or alkenylene of up to 8 carbon atoms, phenylene or benzylene, and X is hydrogen, halogen, hydroxy, —OR$_1$, —COOH or —COOR$_1$, R$_1$ being alkyl of 1 to 8 carbon atoms, are prepared by hydrolysis of the corresponding cyanoformimide thioesters of the formula $$NC-\underset{NH}{\overset{\parallel}{C}}-SRX$$

with an acqueous acid having a pH of less than 6.

---

This invention relates to novel cyanformic thioesters of the formula

NC—CO—SRX in which R is alkylene (preferably of 1 to 8 carbon atoms), alkenylene, arylene or or aralkylene; X is hydrogen, halogen, hydroxy, —OR$_1$, —COOH or —COOR$_1$, R$_1$ being alkyl of 1 to 8 carbom atoms and to a process for preparing them from the corresponding cyanoformimide thioesters of the formula $$NC-\underset{NH}{\overset{\parallel}{C}}-SRX$$

in which R and X are as defined above, by hydrolysis with an aqueous inorganic acid having a pH of less than 6.

The cyanoformimide thioesters useful as starting materials for obtaining the desired corresponding cyanformic thioesters are obtainable, as described in copending application Ser. No. 536,279 of Welhelm Gruber and Peter Quis, filed on the same date as this application, by reacting a substantially equimolar amount of cyanogen with a mercaptan in the presence of a suitable catalyst.

Mercaptans that are particularly suitable as starting materials for the preparation of such cyanoformimide thioesters include methyl, ethyl, propyl, butyl, octyl, allyl, phenyl, benzyl, β-methoxy-ethyl, β-hydroxyethyl and β-dimethyl-aminoethyl mercaptans, thioglycollic acid, the alkyl esters and amides thereof, p-chlorothiophenol and α-mercapto benzthiazol.

The cyanoformimide thioesters are obtaintable by reacting the starting materials, a mercaptan and cyanogen, at a temperature between about −30° C. and about +150° C., preferably within the range of −5° C. to room temperature, in the presence of a catalytic amount of (A) a primary, secondary or tertiary aliphatic or aromatic amine or quaternary ammonium salt having 1 to 30 carbon atoms, or an alkali- or alkaline-earth compound, or (B) a compound of magnesium, aluminum or a heavy metal.

When the reaction is carried out with one or more of the Group A catalysts, it is necessary to maintain a constant excess of cyanogen in the reaction medium, e.g., by introducing the mercaptan into cyanogen or a cyanogen-containing reaction medium to avoid formation of an oxalic acid di-imide dithio ester. When, however, the reaction is carried out with one or more of the Group B catalysts, this precaution is unnecessary.

Suitable Group A catalysts include such primary secondary and tertiary amines and quaternary ammonium salts as butylamines, decylamines, diethylamine, aniline, hexamethylene diamines, triethylamine, tributylamines, piperridine, pyridine and tethamethyl ammonium hydroxide, as well as such alkali metal and alkaline earth metal compounds as the oxides, hydroxides, lower alkyl alcoholates, sulfides, alkylmercaptides, cyanides, carbonates and tertiary phosphates of lithium, sodium, potassium, calcium and barium, and the salts thereof with saturated or unsaturated, organic mono-, di-, tricarboxylic acids and halogen-substituted carboxylic acids having 1 to 8 carbon atoms. In Group B, suitable catalysts include, by way of example, the sulfates, sulfides, alkylmercaptides, halides, cyanides, cyanates, oxides, hydroxides, lower alkyl alcoholates, carbonates and phosphates of magnesium, aluminum and heavy metals, as well as the salt thereof with mono-, di-, tricarboxylic acids, halogen-substituted carboxylic acids having 1 to 8 carbon atoms, and complex compounds of said metals. The term "heavy metals" refers to metals, as defined in H. Rompp, "Chemie-Lexicon," 5th Edition (1962), having a density in excess of 5 g/cc., e.g., silver, bismuth, cadmium, cobalt, chromium, copper, mercury, manganese, molybdenum, nickel, iron, lead, titanium, vanadium, tungesten, zinic and zirconium.

The amount of catalyst employed may vary widely, e.g., between about 0.01 and about 10 mol percent, preferably of the order to about 5 mol percent based on the amount of mercaptan reactant.

The reaction may be carried out in the liquid or vapor phase. When it is carried out in the liquid phase, the cyanoformimide thioester reaction product itself may be utilized as a solvent or reaction medium for the reactants. All organic solvents that are inert to the reactants and the catalyst, e.g., lower alkyl ethers and esters, low molecular weight chlorinated hydrocarbons, and aliphatic and aromatic hydrocarbons which have good solubility for cyanogen and at least some solubility for the mercaptan reactant are suitable. The catalyst may be soluble or insoluble in the solvent. If the reaction product is not capable of distillation, however, it is advantageous to use a catalyst that is insoluble in the reaction medium to facilitate direct obtention of an impurity-free reaction product upon filtration and removal of the solvent. If the reaction is carried out in the vapor phase, e.g., by reacting a vapor form of a mercaptan upon contact with a solid catalyst in an atmosphere of cyanogen, a solvent is unnecessary.

The process can be carried out, when a Group A catalyst requiring an excess of cyanogen is employed, by introducing the mercaptan gradually into a reaction medium of dissolved cyanogen, or cyanogen vapor, containing the catalyst. To promote maximum economy and conversion of both reactants, the reactants are used in substantially equimolar amounts. It is also possible to introduce equimolar amounts of the two reactants into a cyanogen-containing reaction medium. In any event, the possibility of a local molar excess of mercaptan should be avoided by intensive stirring or other agitation.

When a Group B catalyst is used, it makes no difference whether one reactant or the other is temporarily present in excess. Therefore, they can be added in any desired sequence or together. A simple and effective mode of operation is that of introducing cyanogen gas into a liquid mercaptan or a solution thereof containing a Group B catalyst.

The cyanoformimide thioesters thus obtainable can be converted to the corresponding cyanformic thioesters of the invention by hydrolysis with any aqueous organic or inorganic acid having a pH of less than 6. The initial cyanoformimide thioester need not be in purified form, but may be treated for hydrolysis while in crude form, if desired while still in the solvent or reaction medium in which it was formed. It is essential that the aqueous acid be utilized in a proportion sufficient to avoid an increase in pH to over 6. Generally, an equivalent proportion of acid is sufficient for that purpose. The desired cyanformic thioester can be extracted from the aqueous phase with ether.

One preferred mode of procedure is that of effecting the hydrolysis in a two-phase system, one being an aqueous acid phase and the other an organic phase, i.e., a water-immiscible, inert, organic solvent for the reaction product, such as diethyl ether, aromatic and lower aliphatic hydrocarbons, chlorinated hydrocarbons, etc. After all reactants have been added, the reaction mixture is stirred vigorously for some time at a temperature between about 0 and 100° C., preferably between about 0 and 50° C. The reaction product is separated from the neutralized and dried organic phase by evaporation of the solvent and, if necessary or desired, purified by distillation. The yield can be increased by extracting the aqueous phase with a water-immiscible solvent and working up the extract with the organic phase.

The thioesters of this invention are toxic and are useful as contact, ingestive and respiratory insecticides for insects of all kinds, e.g., in the form of a 0.5% solution in mineral oil or a 0.5% emulsion in water for spray-eradication of mosquito larvae. The emulsion can, if necessary, be stabilized by use of known emulsifying agents.

The versatility and effectiveness of the method of this invention, and the diversity of the thioesters obtainable thereby will become further apparent from the following examples.

EXAMPLE 1

Cyanformic methyl thioester

Ten grams (0.1 mol) cyanoformimide methyl thioester are dissolved in 50 grams diethylether. At room temperature, 50 grams of a 10% aqueous hydrochloric acid are added to the solution dropwise while stirring. The reaction mixture is stirred for an additional two hours at 35° C. The ether phase is separated, neutralized, dried and then subjected to vacuum distillation. Cyanformic methyl thioester is obtained in a yield of 5.2 grams (51.5% Th.). It had a boiling point, at 2 mm. Hg of 26° C. and an $n_D^{20}$ of 1.4795.

*Analysis.*—Calculated: N, 13.9%; S, 31.7%. Found: N, 13.85%; S, 31.3%.

EXAMPLE 2

Cyanformic ethyl thioester 22.8 grams (0.2 mol) cyanoformimide ethyl thioester are dissolved in 100 grams diethylether. At room temperature, 220 grams of 10% aqueous sulfuric acid are added dropwise and the reaction mixture is stirred at 35° C. for an additional two hours. After separation, neutralization with sodium bicarbonate solution and drying, the ether phase is subjected to distillation to yield 16.9 grams cyanformic ethyl thioester (73.5% Th.) having a boiling point, 10 mm. Hg of 39–40° C. and a $n_D^{20}$ of 1.4714.

*Analysis.*—Calculated: N, 12.2%. Found: N, 11.9%.

EXAMPLE 3

Cyanformic ethyl thioester 22.8 grams (0.2 mol) cyanformic ethyl thioester are hydrolyzed in the same manner as described in Example 2 but with 200 grams of a 10% phosphoric acid solution. After working up the reaction product in the same manner as described in Example 2, 14.5 grams cyanformic ethyl thioester (63.0% Th.) are obtained.

EXAMPLE 4

Cyanformic ethyl thioester 22.8 grams (0.2 mol) cyanoformimide ethyl thioester are subjected to hydrolysis in the same manner as described in Example 2 but with 560 grams of a 10% p-toluene sulfonic acid solution. One obtains 10.5 grams (45.7% Th.) cyanformic ethyl thioester.

EXAMPLE 5

Cyanformic ethyl thioester 22.8 grams (0.2 mol) cyanoformimide ethyl thioester are subjected to hydrolysis in the same manner as described in Example 2 but with 100 grams of a 50% formic acid solution. 13 grams (56.5% Th.) cyanformic ethyl thioester are obtained.

EXAMPLE 6

Cyanformic benzyl thioester 17.6 grams (0.1 mol) cyanoformimide benzyl thioester are dissolved in 50 grams diethylether and subjected to hydrolysis by addition of 50 grams 10% aqueous hydrochloric acid at 0° C. The reaction mixture is stirred for an additional 2.5 hours at 0° C., the ether phase is then separated, neutralized with sodium bicarbonate and dried. The ether is removed under vacuum at 10 to 20° C. to yield 15.2 grams cyanformic benzyl thioester (86% Th.).

Analysis of the crude product.—Calculated: N, 7.92%. Found: N, 7.78%.

EXAMPLE 7

Cyanformic-n-butyl thioester 28.4 grams (0.2 mol) cyanoformimide butyl thioester are dissolved in 150 grams methylene chloride and hydrolyzed and worked up, as described in Example 2, with 100 grams of 10% aqueous hydrochloric acid. The yield is 19.2 grams (67.2 Th.) cyanformic-n-butyl thioester having an $n_D^{20}$ of 1.4701 and a boiling point at 4 mm. Hg of 68° C.

EXAMPLE 8

Cyanformic-n-butyl thioester

The procedure described in Example 7 is repeated, the only difference being that 150 grams benzene are used as solvent in place of the methylene chloride. The yield is 20 grams (70% Th.) cyanformic-n-butyl thioester.

EXAMPLE 9

Cyanformic-n-propyl thioester 35 grams (0.68 mol) cyanogen are dissolved in 200 grams diethylether at about −10° C. 5.5 grams (4 mol percent, calculated on the propyl mercaptan) of cadmium acetate-dihydrate are added to the solution. At this temperature, 38.1 grams (0.5 mol) of n-propyl mercaptan are slowly added dropwise while stirring. After the solution warms to 20° C., stirring is continued at that temperature for about 2 to 3 hours. Then, 200 grams of a 10% aqueous hydrochloric acid are added dropwise while stirring and the reaction mixture is heated to 35° C. while continuing stirring for another two hours. The ether phase is then separated, dried with anhydrous sodium sulfate and subjected to distillation. The yield is 52.9 grams (82.7% Th., based on $C_3H_7SH$) cyanformic-n-propyl thioester having an $n_D^{20}$ of 1.4711 and a boiling point at 3.5 mm. Hg, of 50 to 52° C.

*Analysis.*—Calculated: N, 10.9%, S, 24.8%. Found: N, 10.4%, S, 24.6%.

EXAMPLE 10

Cyanformic-n-butyl thioester

By following the procedure described in Example 9 with 7.3 grams cadmium, n-butyl-mercaptide and 45.1 grams (0.5 mol) n-butyl mercaptan, all other elements of the example being the same, 59 grams (83.0% Th.) cyanformic-n-butyl thioester are obtained having an $n_D^{20}$ of 1.4698 and a boiling point at 4 mm. Hg. of 68° C.
*Analysis.*—Calculated: N, 9.8%. Found: N, 9.8%.

EXAMPLE 11

Cyanformic-n-octyl thioester

By following the procedure described in Example 9 utilizing 5.5 grams cadmium acetate-dihydrate, 35 grams cyanogen and 73.2 grams (0.5 mol) n-octyl mercaptan and 230 grams 10% aqueous hydrochloric acid and extracting with 200 grams diethylether, 54.6 grams (55% Th.) cyanformic-n-octyl thioester having an $n_D^{20}$ of 1.4702 and a boiling point, at 2 mm. Hg, of 106° C. are obtained.

*Analysis.*—Calculated: N, 7.04%. Found: N, 6.94%.

EXAMPLE 12

Cyanformic allyl thioester

By following the procedure described in Example 9 with 35 grams cyanogen, 5.5 grams cadmium acetate-dihydrate, 200 grams diethylether, 37.1 grams (0.5 mol) allyl mercaptan and 230 grams of 10% aqueous hydrochloric acid, 28.5 grams cyanformic allyl thioester (45% Th.) having an $n_D^{20}$ of .4953 and a boiling point at 1.5 mm. Hg of 45° C. is obtained.

*Analysis.*—Calculated: N, 11.0%, S, 25.4%. Found: N, 10.0%, S, 25.3%.

EXAMPLE 13

Cyanformic phenyl thioester

Eighty grams cyanogen are dissolved in 200 grams diethylether at about —10° C., 6.7 grams cadmium acetate-hydrate are added as catalysts and, at a temperature of —10 to 0° C., 55 grams (0.5 mol) thiophenol dissolved in 100 grams diethylether, are added dropwise. The reaction mixture is stirred for an additional two hours at 0° C. and subjected to hydrolysis at 0° C. by adding 240 grams of 10% aqueous hydrochloric acid. After separating the ether phase and distilling off the ether under vacuum at 10 to 20° C., cyanformic phenyl thioester remains behind as a yellowish oil. This cannot be distilled without decomposition. The yield is 80.3 grams (98.5% Th., calculated on $C_6H_5SH$).

EXAMPLE 14

Cyanformic-n-propyl thioester 105 grams of 10% aqueous hydrochloric acid are added dropwise at 20° C. to 25.6 grams (0.2 mol) cyanoformimide n-propyl thioester in ether. The reaction mixture is vigorously stirred for three hours and then extracted several times with ether. The ether phase is shaken with sodium bicarbonate solution, dried and distilled under vacuum to yield 16.3 grams (63% Th.) cyanformic n-propyl thioester having an $n_D^{20}$ of 1.4717.

*Analysis.*—Calculated: N, 10.9%. Found: N, 11.3%.

EXAMPLE 15

Cyanformic n-butyl thioester

By repeating the procedure described in Example 14 with 28.4 grams (0.2 mol) cyanoformimide n-butyl thioester, a yield of 26.25 grams (91.9% Th.) cyanformic n-butyl thioester having an $n_D^{20}$ of 1.4703 are obtained.

*Analysis.*—Calculated: N, 9.78%. Found: N, 9.86%.

EXAMPLE 16

Cyanformic β-hydroxyethyl thioester

A solution of cyanoformimide β-hydroxyethyl thioester is first prepared by adding 39 grams thioglycol containing 1.95 grams triethylamine in the course of 15 minutes to a solution of 35 grams cyanogen in 200 ml. diethylether at a temperature of about —10° C. At room temperature, 150 grams of a 15% aqueous hydrochloric acid are introduced dropwise in the couse of 25 minutes and the reaction mixture is stirred for an additional two hours. The reaction mixture forms two phases, the upper (ether) phase of which is dried with sodium sulfate and subjected to distillation. After removal of the ether, 8.7 grams cyanformic, β-hydroxyethyl thioester are distilled off at 133 to 139° C. at 4 mm. Hg.

*Analysis.*—Calculated: N, 10.7%. Found: N, 10.8%.

EXAMPLE 17

Cyanformic carboxymethyl thioester 30.5 grams of cyanformic carboxymethyl formed by reaction of cyanogen with thioglycolic acid and not further purified (Analysis.—Calculated: N, 19.45%, Found: N. 18.5%) are stirred with 200 grams diethylether and 100 grams of 18% hydrochloric acid. The upper phase is then dried and evaporated, whereupon 20 grams cyanformic carboxymethyl thioester are obtained as undistillable residue.

*Analysis.*—Calculated: N, 9.66%. Found: N, 9.2%.

EXAMPLE 18

Cyanformic β-ethoxyethyl thioester

A solution of cyanoformimide β-ethoxyethyl thioester is prepared by introducing 26 grams cyanogen into a solution of 53 grams β-ethoxyethyl mercaptan and 6.7 grams cadmium acetate-dihydrate in 200 ml. diethylether at 0° C. while stirring well. After stirring for an additional two hours at room temperature, 200 grams of 18% hydrochloric acid are added while stirring vigorously. The solution is then stirred for an additional three hours at the boiling temperature of the ether, the ether phase is then separated, dried and subjected to distillation. 40 grams cyanformic β-ethoxyethyl thioester are thus obtained as a light yellow oil.

*Analysis.*—Calculated: N, 8.8%. Found: N, 8.5%.

EXAMPLE 19

Cyanformic p-chlorophenyl thioester

A solution of cyanoformimide p-chlorophenyl thioester is prepared in the manner described in Example 18 from p-chlorothiophenol and cyanogen and thereupon hydrolyzed. The cyanformic p-chlorophenyl thioester is obtained in a yield of 24% theoretical.

*Analysis.*—Calculated: N, 7.09%. Found: N, 7.2%.

EXAMPLE 20

Cyanformic 2-benzothiazol thioester

By following the procedure described in Example 18 with 2-mercapto benzothiazol and cyanogen, an ether solution of cyanoformimide benzothiazol thioester is obtained and, by hydrolysis with 18% hydrochloric acid is converted into the corresponding cyanformic thioester. This is obtained in a yield of 17.8% theoretical.

*Analysis.*—Calculated: N, 12.72%. Found: N, 12.4%.

What is claimed is:

1. A cyanformic thioester of the formula

NC—CO—SRX in which R is alkylene or alkenylene of up to 8 carbon atoms, phenylene or benzylene; and X is hydrogen, halogen, hydroxy, —$OR_1$, —COOH or —$COOR_1$, $R_1$ being alkyl of 1 to 8 carbon atoms.

2. A compound as defined in claim 1 wherein RX is alkyl of 1 to 8 carbon atoms.

3. A compound as defined in claim 1 wherein RX is allyl.

4. A compound as defined in claim 1 wherein RX is phenyl.

5. A compound as defined in claim 1 wherein RX is benzyl.

6. A compound as defined in claim 1 wherein RX is hydroxy lower alkyl.

7. A compound as defined in claim 1 wherein RX is lower alkoxy lower alkyl.

8. A compound as defined in claim 1 wherein RX is carboxy lower alkyl.

9. A compound as defined in claim 1 wherein RX is chlorophenyl.

10. Process for preparing a compound as defined in claim 1 which comprises hydrolyzing a cyanoformimide thioester of the formula

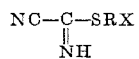

in which R is alkylene or alkenylene of up to 8 carbon atoms, phenylene or benzylene; X is hydrogen, halogen, hydroxy, —$OR_1$, —COOH or —$COOR_1$, $R_1$ being alkyl of 1 to 8 carbon atoms, with an aqueous acid at a pH below 6.

No references cited.

ALEX MAZEL, Primary Examiner

BERNARD I. DENTZ, Assistant Examiner

U.S. Cl. X.R.
260—304, 306.7, 309.2; 424—269, 304